United States Patent
Gu (10) Patent No.: US 9,781,633 B2
(45) Date of Patent: *Oct. 3, 2017

(54) FREQUENCY AGILITY FOR AN ISM BAND HOME AREA NETWORK

(71) Applicant: Google Inc., Mountain View, CA (US)

(72) Inventor: Yaoyao Gu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/153,159

(22) Filed: May 12, 2016

(65) Prior Publication Data

US 2016/0262071 A1 Sep. 8, 2016

Related U.S. Application Data

(63) Continuation of application No. 14/268,143, filed on May 2, 2014, now Pat. No. 9,467,899.

(51) Int. Cl.

| H04W 28/16 | (2009.01) |
|---|---|
| H04W 24/04 | (2009.01) |
| H04W 24/02 | (2009.01) |
| H04L 12/707 | (2013.01) |
| H04W 36/00 | (2009.01) |
| H04W 36/26 | (2009.01) |
| H04W 72/04 | (2009.01) |
| H04W 72/08 | (2009.01) |
| H04W 36/20 | (2009.01) |

(52) U.S. Cl.
CPC .............. *H04W 28/16* (2013.01); *H04L 45/22* (2013.01); *H04W 24/02* (2013.01); *H04W 24/04* (2013.01); *H04W 36/0061* (2013.01); *H04W 36/20* (2013.01); *H04W 36/26* (2013.01); *H04W 72/0453* (2013.01); *H04W 72/082* (2013.01)

(58) Field of Classification Search
CPC ....... H04W 4/20; H04W 88/06; H04W 24/00; H04W 36/0016; H04W 36/36; H04W 36/0083; H04W 72/1284; H04W 36/30; H04W 36/12; H04W 16/14; H04L 67/125
See application file for complete search history.

(56) References Cited

U.S. PATENT DOCUMENTS

| 2003/0231621 A1* | 12/2003 | Gubbi | H04B 17/382 370/352 |
|---|---|---|---|
| 2006/0072567 A1* | 4/2006 | Casaccia | H04L 27/2647 370/389 |

(Continued)

FOREIGN PATENT DOCUMENTS

EP 2683200 3/2014

*Primary Examiner* — Raj Jain
*Assistant Examiner* — Hoyet H Andrews, III
(74) *Attorney, Agent, or Firm* — Morris & Kamlay LLP (57) ABSTRACT

Due to interference that typically occurs in the ISM band, it may be necessary for one or more network devices to switch to an alternative channel. A list of one or more alternate network channels may be generated by a coordinating/gateway device based on the energy level and a distance from a primary network channel. The alternate network channel list may be distributed to neighbor devices and, in the event of interference, link loss, and/or a channel switch notification, the neighbor devices may automatically switch to the first alternate network channel in the list.

26 Claims, 5 Drawing Sheets

(56) References Cited

U.S. PATENT DOCUMENTS

| | | | |
|---|---|---|---|
| 2006/0176850 A1* | 8/2006 | Gan | H04B 1/715 370/329 |
| 2009/0129273 A1* | 5/2009 | Zou | H04L 45/70 370/235 |
| 2010/0091715 A1* | 4/2010 | Akchurin | H04W 4/20 370/329 |
| 2010/0271948 A1* | 10/2010 | Challapali | H04W 72/085 370/235 |
| 2011/0110255 A1* | 5/2011 | Park | H04B 17/382 370/252 |
| 2013/0121337 A1 | 5/2013 | Nguyen | |
| 2013/0142059 A1 | 6/2013 | Di Girolamo | |
| 2013/0251180 A1 | 9/2013 | Solum | |

\* cited by examiner

FREQUENCY AGILITY FOR AN ISM BAND HOME AREA NETWORK

CROSS-REFERENCE TO RELATED APPLICATIONS

The present Application for Patent is a continuation of U.S. Non-Provisional patent application Ser. No. 14/268,143, entitled "FREQUENCY AGILITY FOR AN ISM BAND HOME AREA NETWORK," filed May 2, 2014, assigned to the assignee hereof, and expressly incorporated herein by reference in its entirety.

BACKGROUND

The industrial, scientific, and medical ("ISM") radio band with a central frequency of 915 MHz is a widely used frequency band in the U.S. for home area networking products (specifically for home automation and smart grid applications). Wireless products using this band are typically subjected to severe interference from other radio products, such as baby monitors, cordless phones, IEEE 802.15.4 radios, etc. These radio products, especially baby monitors, may use this frequency band to transmit analog video signal which can, individually, easily occupy approximately or up to 70% of the entire band. If another home area network device is using any frequency occupied by the analog baby monitor, that device will encounter channel access failure.

Most modern devices implement a radio technology in the form of a Carrier Sense Multiple Access ("CSMA") Collision Avoidance ("CSMA-CA") mechanism. For example, a device may sense the channel before it sends any packets and back off if the channel is busy. Mitigating and/or avoiding interference caused by other radio devices in general is a challenging problem. The 915 MHz frequency band in particular is challenging because many of the existing devices in this radio band use an aggressive channel access scheme and occupy a large percentage of the entire band. CSMA is an example of a channel access scheme that is not aggressive. Other similar radio technologies may use a "listen before talk" protocol that, prior to attempting transmission of a packet, sets a radio to receive mode first. The radio may attempt to listen on the channel to determine if any other device is transmitting at that point. If it determines another device is transmitting on the channel, then it may not transmit or wait for a predetermined amount of time before attempting transmission. An aggressive scheme may refer to an instance where a device is constantly transmitting, such as a baby monitor.

Substantial research has been invested in interference mitigation for 802.15.4 devices, e.g., coexistence of 802.15.4 (ZigBee) and 802.11 (WiFi) devices since they often co-locate in home area networks and both use the same 2.4 GHz frequency band. Due to the differences in transmit power and bit rate, a ZigBee device can suffer significantly from WiFi interference. A popular approach to solve the coexistence problem is to adjust the Clear Channel Assessment ("CCA") threshold in 802.15.4 to make its channel access scheme more/less aggressive. This approach is not particularly useful in the 915 MHz, ISM frequency band since many of the devices responsible for the interference do not apply a CSMA scheme (e.g., a baby monitor).

ZigBee defines a frequency agility mechanism in which all devices keep a counter of channel access failure. When that counter passes a given threshold (e.g., 25%), all devices enter a discovery mode. Each device first performs an energy scan of all channels and then sends the scan result back to the network manager device. The network manager determines if the entire network should switch to a different channel and, if so, to which channel the entire network should switch. Thus, it uses the already interfered channel to communicate the scan result and channel switch command. These messages can easily be lost because the channel already exhibits a high level of interference. This may cause the entire frequency agility scheme to be unreliable.

BRIEF SUMMARY

According to an implementation, during formation of a network, an energy level for one or more network channels may be determined. One of the one or more network channels with a low energy level may be selected. At least one alternate network channel may be selected. The at least one alternate network channel may be below a threshold energy level and be distal to the selected one of the plurality of network channels. The at least one alternate network channel may be communicated to at least one device on the network.

In an implementation, a network on which a coordinating device is communicating may be joined. A list of alternate network channels from the coordinating device may be received. The list may include at least one alternate network channel. A switch to a first alternate network channel may be determined to be required based on at least one of a detection of interference, a link loss from one or more neighbor devices, and/or a detection of a channel switch notification. The first alternate network channel may be switched to.

A system is disclosed that includes a radio and a processor. The radio may be configured to communicate with a network. The processor may be coupled to the radio and configured to determine an energy level for one or more network channels during network formation. The processor may select one of the one or more network channels with a low energy level. The processor may select at least one alternate network channel. The at least one alternate network channel may be below a threshold energy level and be distal to the selected network channel. The processor may communicate the at least one alternate network channel to at least one device on the network.

In an implementation, a system that includes a radio and a processor is disclosed. The radio may be configured to communicate with a network. The processor can be coupled to the radio and be configured to join a network on which a coordinating device is communicating. It may receive, directly or indirectly such as via the radio, a list of alternate network channels from the coordinating device. The list may include at least one alternate network channel. The processor may determine a switch to a first alternate network channel may be necessary based on at least one of: a detection of interference, a link loss from one or more devices, and/or a detection of a channel switch notification. The processor may switch to the first alternate network channel.

In an implementation, a system according to the presently disclosed subject matter includes a means for determining an energy level for one or more network channels during formation of a network. The system may include a means for selecting one of the one or more network channels with a low energy level. The system may include a means for selecting at least one alternate network channel. The at least one alternate network channel may be below a threshold level and be distal to the selected network channel. The system may include a means for communicating the at least one alternate network channel to at least one device on the network.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

During network formation, a coordinator/gateway device (i.e., the first device on the network) may scan the network channels and return a list of channels with a low energy level, e.g., with less interference present. It may select a channel with the least or low energy level. The coordinator/gateway device may select a list of alternate channels. These alternate channels may be selected on the basis of criteria including: (1) channels that have a low energy level and (2) channels that are distal to the selected primary channel. A ranking algorithm may be applied to these criteria to rank channels in the alternate channels list. For example, alternate channels may be ranked based on energy level and/or channel distance. The gateway/coordinator device may communicate the alternate channel list to devices that become a part of (join) the network.

An implementation may adopt a common scheme for interference detection. For example, the devices may determine a number of transmission failures due to channel access failure. When that number reaches a certain threshold, the devices may determine the channel has a high level of interference and one or more may enter a discovery mode. Thus, instead of communicating about the interference to the coordinator/gateway device over the original channel that already suffers from interference, devices that have detected interference may move to the first alternate channel on the alternate channel list. For a device that did not detect interference itself, if it detected link loss from a threshold, for example 75%, of its neighbors, it may also switch to the first alternate channel on the alternate channel list. Devices may broadcast information to their one hop neighbors about their channel switching. Devices that do not detect interference, and with over 70% neighbor present, may initiate a timer when they first receive a channel switch notification from any of their neighbors. When that timer expires, the devices may individually determine if their neighbors are still present. If not, they may switch to the new channel as well.

After a device switches to the new channel, it may determine if it can reach the coordinator/gateway device for a predetermined amount of time. If it can reach the coordinator/gateway device, then it may stay on the channel. If it cannot, then it may determine the link status of its previous neighbors (i.e., neighbor devices that were on the former, primary channel). If less than a threshold, for example 50%, of its saved neighbors are on the alternate channel, it may switch back to the original, primary channel. Otherwise, it may stay on the new channel and again attempt to determine the number of neighbor devices that appear on the alternate channel.

Figure 1:
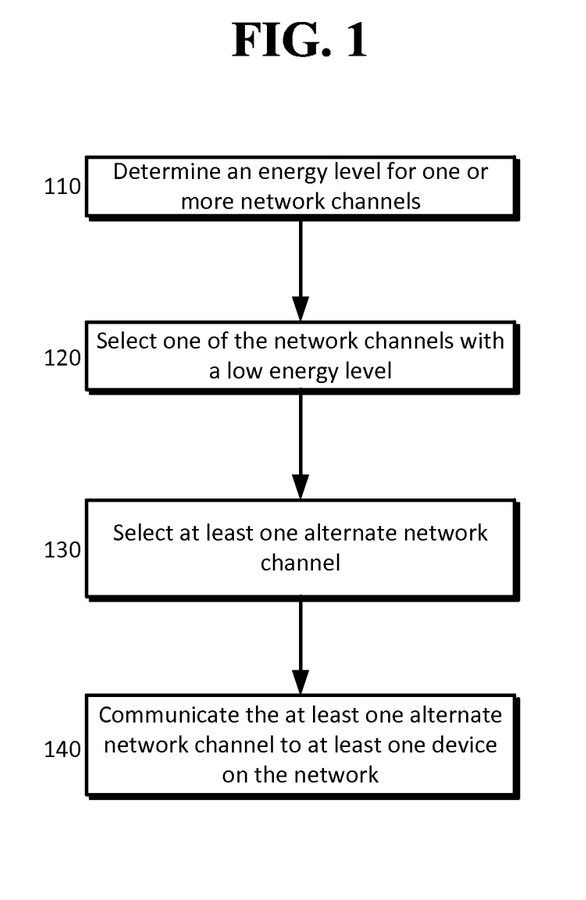
FIG. 1 is an example process for selecting one or more alternate network channels based on criteria such as energy level and distance from the primary channel as disclosed herein.

In an implementation, an example of which is provided in FIG. 1, an energy level for one or more network channels may be determined during formation of a network at 110. An energy level may be determined, for example, by a Received Signal Strength Indicator ("RSSI") or other technique. Network formation may refer to an instance when one or more devices that communicate with one another (e.g., over the home network) join a network. The first device to join the network may be deemed the coordinator or gateway device. The coordinator/gateway device may scan the network channels to determine an energy level. Examples of coordinating/gateway devices and neighboring devices include, but are not limited to: a smart light, a smart light switch, a smart thermostat, a smart appliance, a smoke detector, a security system, a smart door lock, a smart sensor, etc. These devices are "smart" because, inter alia, they are capable of interacting with one another, sending/receiving instructions regarding their performance or setting, updating a setting or firmware, and communicating with a network. The coordinating/gateway device may be the only device connected to the network. Neighbor devices may communicate with one another and/or coordinating/gateway device. The network to which the coordinating/gateway device is connected may be a home network (e.g., a LAN, WiFi) that provides internet access for a user's computing devices and the household. Typically, the coordinating/gateway devices and/or neighbor devices are embedded systems that contain flash memory, a communication module (e.g., a wireless transceiver), and/or a processor. The flash memory may contain the operating system and/or an application. The processor may execute instructions stored on or received by the device, as is known in the art.

A typical home network access point can have sixteen channels that are separated from one another by 5 MHz. The coordinator/gateway device may select one of the network channels with a low energy level at 120. In some instances, the channel with the lowest energy level, indicating the least interference, may be selected. In some configurations, the system may select from among any network channel with an energy level below a predetermined threshold value. The network channel selected at 120 may be referred to as the primary channel and will act as the channel to which the coordinator/gateway device switches, if necessary. For example, the coordinator/gateway device may determine that the channel on which it joined the network during formation of the network is the channel with the lowest energy. In that event, it may not need to switch to another network channel. If, however, the coordinator/gateway device determines that a channel other than the one on which it joined the network during network formation has the lowest energy level, it may switch to that channel or wait for one or more neighbor devices to appear. It may dispatch a signal to at least those neighbor devices indicating, for example, the channel and timing of when it intends to switch.

At least one alternate network channel may be selected at 130. The at least one alternate network channel may not include the network channel selected at 120. An alternate network channel may be selected because it has an energy level below a threshold value and is distal to the network channel selected at 120. For example, if the selected network channel for the coordinator/gateway device is channel 16, and the energy level for the other 15 channels is identical, the coordinating/network device may assemble a ranked list of one or more alternate channels beginning with channel 1 because channel 1 is the furthest away (most distal) from channel 16. Channel 2 may be next on the alternate channel list because it is the next furthest away channel from channel 16. Thus, channel distance from the current channel (e.g., the one selected at 120) may be determined by the absolute value of the current channel minus the candidate alternate channel. The energy level threshold may be configured by an administrator of the network or by a coordinating/gateway device. Two or more alternate channels may be ranked according to energy level and channel distance by computing a ratio between the energy level and the channel distance. In the event that no channels are below the predetermined energy threshold, the system may select the network channel with the lowest energy level as an alternate channel. The list of alternate channels may be stored on computer readable medium of the coordinator/gateway device, for example.

The at least one alternate network channel may be communicated to at least one device on the network at 140. For example, the coordinator/gateway device may communicate the list of alternate channels to neighbor devices. A neighbor device may be a device that is associated with the coordinator/gateway device such as light switches in a house. A neighbor device may be defined as a device that is on the same network channel as the coordinator/gateway device. A list of neighbor devices may be stored on each computer readable medium for each device. Each light switch may individually join the network and it may communicate over the network with the coordinator/gateway device. The communication may identify the type of device (e.g., a light switch). The coordinator/gateway device may be a device that permits a user to establish universal preferences for the light switches and individual preferences for each switch. For example, a user may desire to have certain lights on at specified times during the day and to have all lights generally set at specific intensity. The coordinator/gateway device, thus, may associate light switches on the network as its neighbors. Similarly, the coordinator/gateway device may identify itself as such to each of the light switches on the network. Thus, each neighbor device may receive the alternate one or more channels in the form of a list from the coordinator/gateway device over the network.

A transmission failure value may be determined to be due to a channel access failure on the selected network channel by the coordinator/gateway device and/or a neighbor device. This may indicate that interference exists on the current network channel. Rather than communicating the detected interference, any device that detected the interference may switch to the first alternate channel on the list. Prior to switching, a channel switch notification may be dispatched to neighbor devices (which may include the coordinator/gateway device). Thus, if a device did not detect the interference, it may still receive an indication that other devices have switched to the first alternate channel. In some configurations, a device may initiate a timer in response to a channel switch notification. After the timer expires, the device may ping the coordinator/gateway device and/or neighbor devices to determine with what percentage of such devices it is still in communication. If a predetermined percentage of neighbor devices and/or coordinator/gateway devices are not detected or if communications failure with such devices is otherwise determined, the device may switch to the alternate network channel.

Even if a device did not detect or receive a channel switch notification, the device may detect a link loss with a predetermined number of neighbors. For example, a device may be in communication with devices in proximity to it or all devices in a home automation or smart grid system. The device may detect that it can no longer communicate or communicate properly with half of its neighbors (including the coordinator/gateway device). It may switch to the first alternate channel on the list because of the 50% link loss amongst its neighbors. The amount of link loss required to trigger the switch to the alternate channel may be configured. Once a device switches to an alternate channel, the device may determine whether any of its neighbors are on the alternate network channel. For example, the device may ping any device known to it as a neighbor device on the alternate channel. If the device determines that few or none of its neighbors are on the alternate channel (e.g., it doesn't receive a response to its ping from one or more neighbors), then the device may initiate a timer or switch back to the primary network channel. For example, the device may initiate a 400 second countdown timer that, upon expiration, the device again pings its neighbors to determine whether or not any have appeared on the alternate network channel. Thus, a switch to a first channel in an alternate channel list may be determined to be required based on at least one of a detection of interference, a link loss from one or more of neighbor devices, and/or a detection of a channel switch notification.

Figure 2:
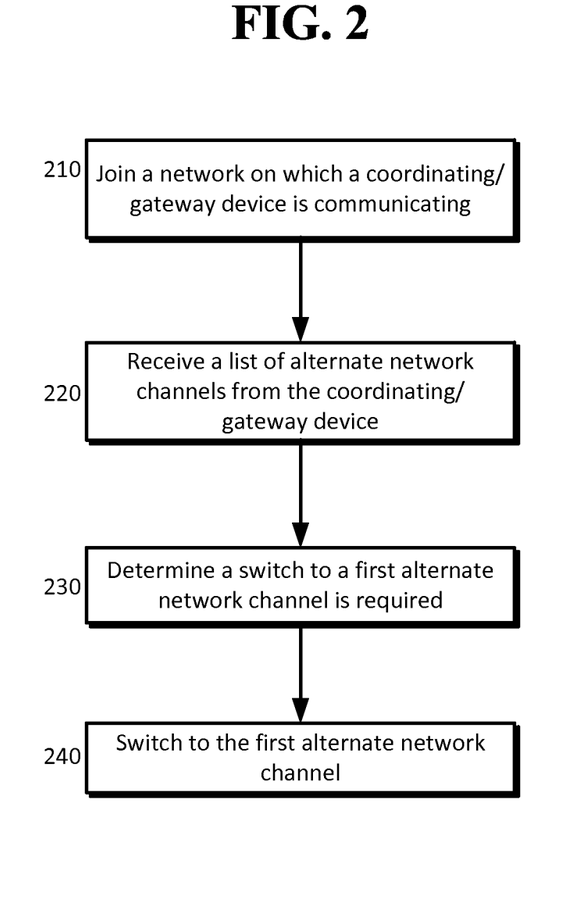
FIG. 2 is an example process switching from a primary channel to an alternate network channel as disclosed herein.

In an implementation, an example of which is provided in FIG. 2, a network channel on which the presence of a coordinating/gateway device is communicated or is present may be joined at 210. As described above, the coordinating/gateway device may join a network on a first channel and switch to a second network channel that it determines has low interference. A device may join the second channel and begin communicating with the coordinating/gateway device. A list of alternate network channels may be received from the coordinating/gateway device at 220 as described above. The list may contain one or more alternate network channels. A switch to a first alternate network channel may be determined to be necessary based on at least one of a detection of interference, a link loss from a one or more neighbor devices, or a detection of a channel switch notification at 230 as described earlier. The first alternate channel may be switched to at 240. The device may determine whether any neighbor devices (including the coordinating/gateway device) are present on the alternate channel. The neighbor devices present on the primary network channel may be a first neighbor group and those detected on the alternate network channel may be a second neighbor group.

If a device begins to experience interference, link loss, and/or receives a channel switch notification on the first alternate network channel, it may switch to the next alternate channel on the list by repeating the steps described above. To avoid having a device immediately being searching for a second alternate channel after switching from the primary network channel to the first alternate network channel, devices may begin a timer and/or wait for all or a majority of neighbor devices to appear on the first alternate network channel. The timer may be set to a predetermined period of time. The timer may be configured to be, for example 1000 seconds, to provide neighbor devices with the opportunity to appear on the first alternate network channel. Thus, a device that have been provided the alternate channel list may have one or more mechanisms to mitigate the possibility of it being unable to settle on an alternate network channel. This can help the device to avoid jumping from one network channel to the next in an effort to locate the alternate channel with minimal interference and distant from the primary channel.

Figure 3:
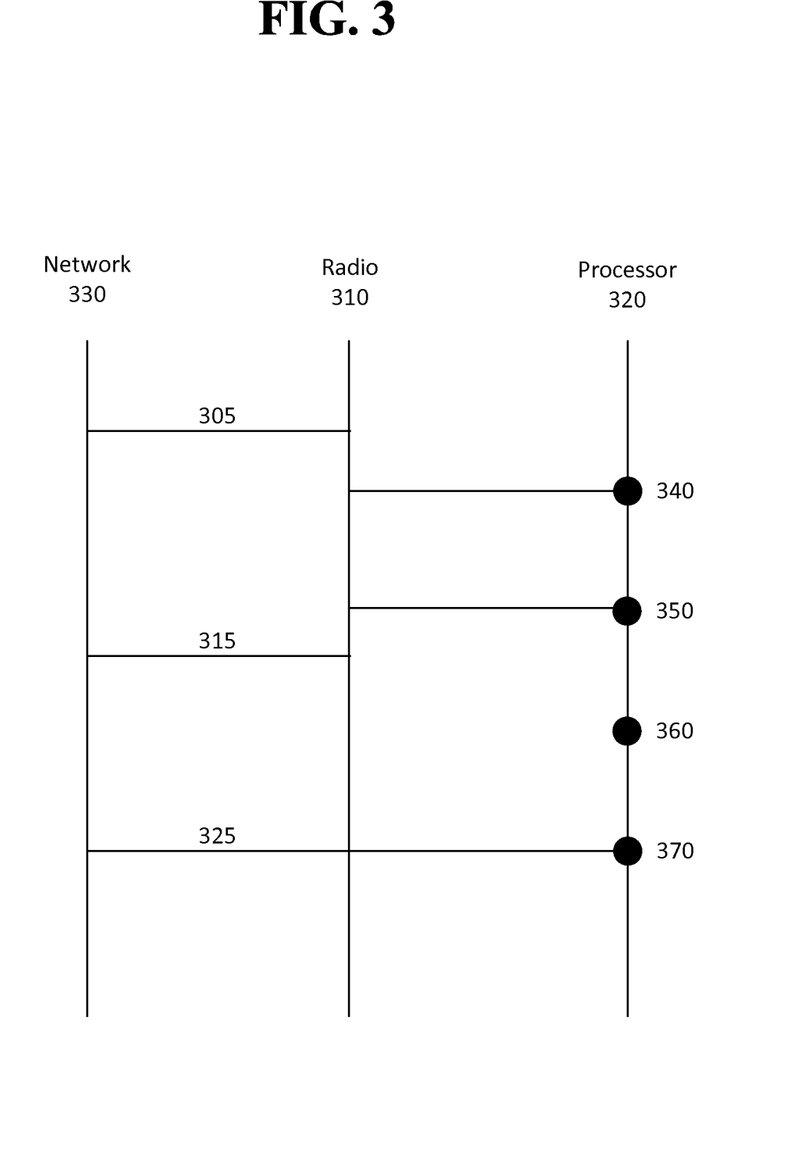
FIG. 3 is an example system that includes a radio and a processor configured to select one or more alternate network channels as disclosed herein.

In an implementation, a system is disclosed that includes a radio 310 and processor 320 as shown in the example in FIG. 3. The radio 310 may be configured to communicate with a network 330 (e.g., a home network or access point) at 305. The processor 320 may be communicatively coupled to the radio 310 (e.g., a component in the same device as the radio and physically connected by a circuit board and/or wire). The processor 320 may determine an energy level for one or more network channels during formation of a network at 340 as described earlier. The processor 320 may select one of the network channels with a low energy level at 350 as described above. For example, the processor 320 may, after receiving RSSI information based on network signals detected by the radio 310, select a primary channel and communicate with the network 330 over the primary channel 315. It may select at least one alternate network channel at 360. Alternate channels that are selected may be stored in a list. The one or more alternate network channels may be selected because they are below a threshold energy level and be distal to the selected one of the plurality of network channels. The processor 320 may communicate the one or more alternate network channels (or the list of alternate network channels) to one or more devices on the network 330.

Figure 4:
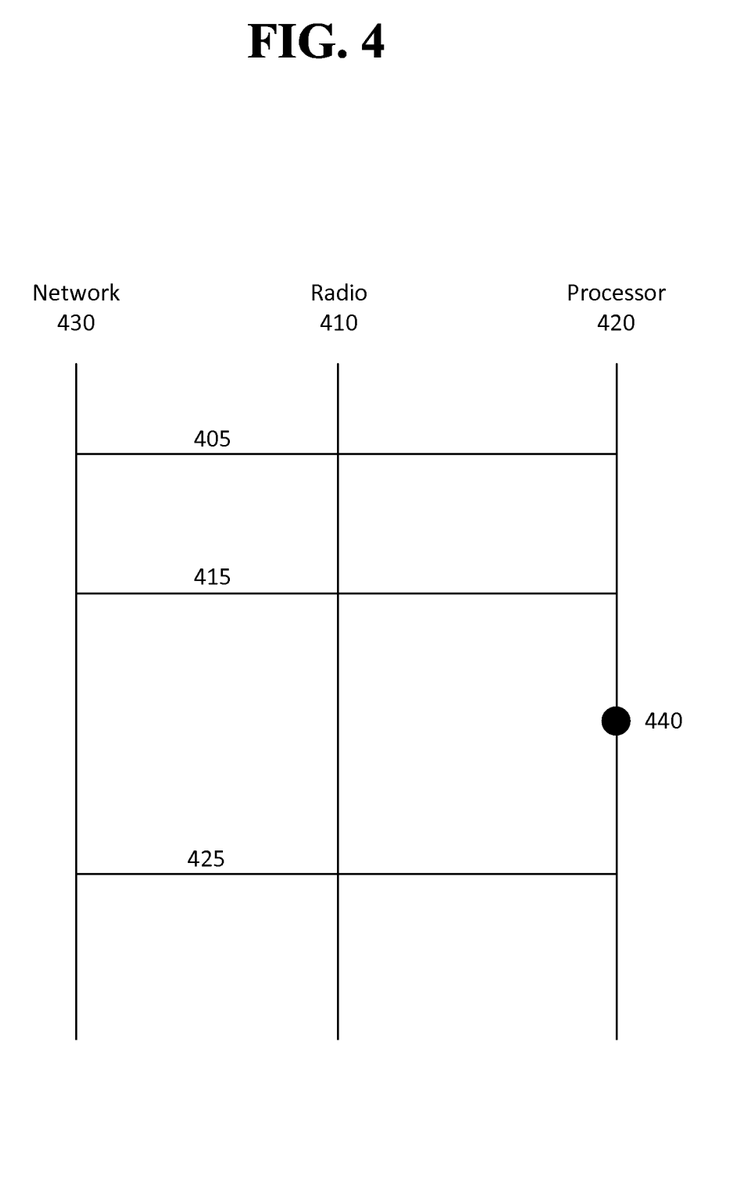
FIG. 4 is an example system that includes a radio and a processor configured to switch from a primary channel to an alternate network channel as disclosed herein.

FIG. 4 is an example implementation of a system that includes a radio 410 configured to communicate with a network 430 and a processor 420 coupled to the radio 410 as described above. The processor 420 may be configured to join a network on which a coordinating device is communicating at 405. The network joined by the coordinating/gateway device may be on a specific network channel. For example, the device may receive an indication from the coordinating/gateway device as to what channel it is currently communicating on. In some configurations, the device may scan each channel to determine the one on which the coordinating/gateway device is communicating. It may receive a list of alternate network channels from the coordinating device at 415. The list of alternate network channels may include one or more alternate network channels. The processor 420 may determine that a switch to a first alternate network channel is required based on at least one of: a detection of interference, a link loss from a first plurality of neighbor devices, or a detection of a channel switch notification at 440 as described earlier. If any of the conditions for a switch to an alternate network channel are met (e.g., a link loss, detection of interference, etc.), the processor 420 may be configured to switch to the first alternate network channel in the list at 425.

Figure 5:
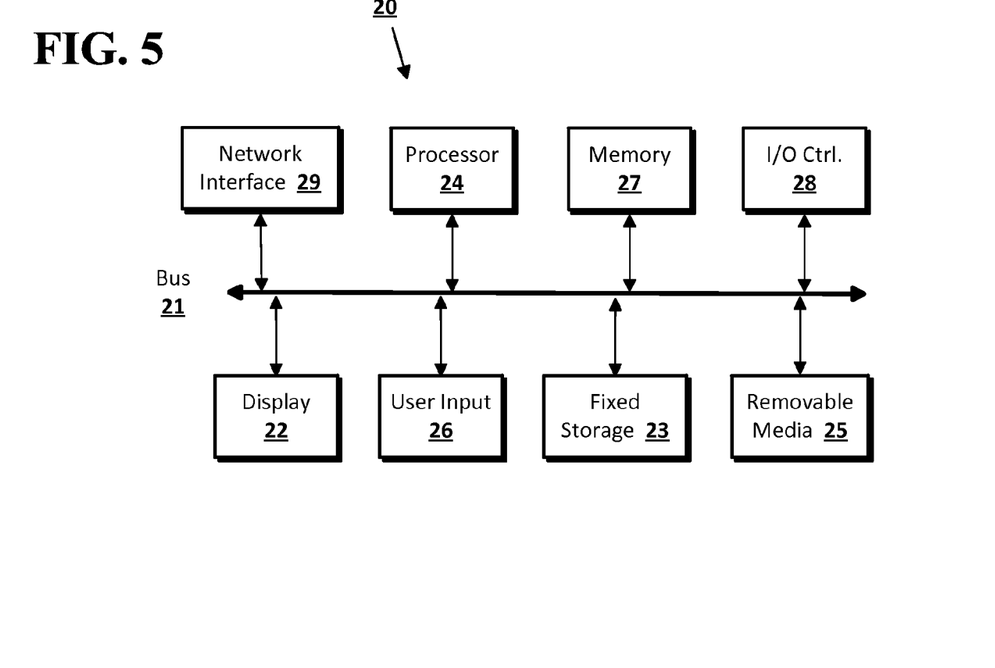
FIG. 5 shows a computer according to an implementation of the disclosed subject matter.

Implementations of the presently disclosed subject matter may be implemented in and used with a variety of component and network architectures. FIG. 5 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, a touch screen, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25. Embedded systems may not contain all of the hardware and/or software components described herein. Embedded systems may contain hardware and/or software components not described here but that are known in the art. An embedded system may handle a particular task such as activating a smart light switch in response to a command from a coordinating/gateway device and/or a neighbor device. The embedded system may contain flash memory that is programmed with specific instructions necessary for the processor of the system to receive commands and respond accordingly.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
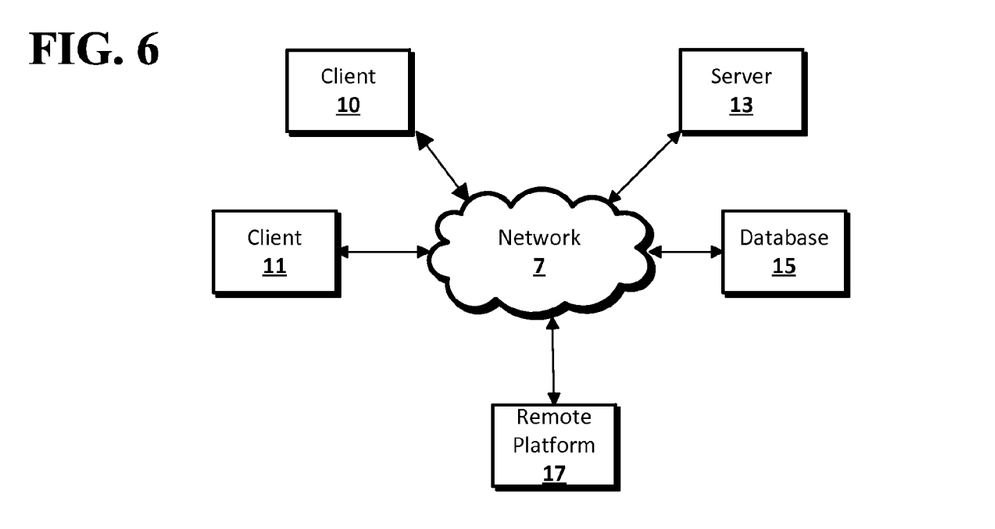
FIG. 6 shows a network configuration according to an implementation of the disclosed subject matter.

FIG. 6 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive data from a provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by systems disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

What is claimed is:

1. A method, comprising:
    selecting, at a wireless device, a primary network channel from a plurality of network channels, wherein the primary network channel is selected from the plurality of network channels based on an interference level of the primary network channel;
    selecting an alternate network channel from the plurality of network channels, wherein the alternate network channel has a respective interference level which is below a threshold interference level;
    switching from the primary network channel to the alternate network channel; and
    switching back to the primary network channel in response to a number of neighbor devices present on the alternate network channel.

2. The method of claim 1, further comprising determining that a value of a transmission failure due to a channel access failure on the primary network channel is above a transmission failure value, wherein the switching to the alternate network channel is performed in response to the determining that the value of the transmission failure is above the transmission failure value.

3. The method of claim 1, further comprising dispatching a channel switch notification to a plurality of the neighbor devices.

4. The method of claim 1, further comprising determining that a plurality of the neighbor devices are present on the alternate network channel.

5. The method of claim 1, further comprising determining that the switching to the alternate network channel is required, wherein the determining is based on at least one of:
    detecting interference on the primary network channel,
    detecting a link loss between the wireless device and one or more of the neighbor devices, or
    receiving a channel switch notification.

6. The method of claim 5, wherein the determining that the switching is required is based on the receiving the channel switch notification, and further comprising initiating a timer in response to the receiving the channel switch notification.

7. The method of claim 5, further comprising storing, in a non-transitory computer-readable medium, a list of the neighbor devices.

8. A method, comprising:
   determining, at a wireless device, that switching from a primary network channel to an alternate network channel is required, wherein the determining is based on at least one of:
      detecting interference on the primary network channel,
      detecting a link loss between the wireless device and one or more neighbor devices, or
      receiving a channel switch notification;
   switching to the alternate network channel;
   determining that less than a threshold number of the neighbor devices are present on the alternate network channel; and
   switching back to the primary network channel.

9. The method of claim 8, wherein the alternate network channel has an interference level which is below a threshold interference level.

10. The method of claim 8, further comprising receiving, from a coordinating device, a list of the one or more alternate network channels.

11. The method of claim 8, further comprising determining a number of the neighbor devices present on the alternate network channel.

12. The method of claim 8, wherein the determining that the switching is required is based on the receiving the channel switch notification, and further comprising initiating a timer in response to the receiving the channel switch notification.

13. The method of claim 8, further comprising storing, in a non-transitory computer-readable medium, a list of the neighbor devices.

14. A system, comprising:
   a radio; and
   a processor coupled to the radio and configured to:
      select a primary network channel from a plurality of network channels, wherein the primary network channel is selected from the plurality of network channels based on an interference level of the primary network channel;
      select a network channel from the plurality of network channels, wherein the alternate network channel has a respective interference level which is below a threshold interference level;
      switch from the primary network channel to the alternate network channel; and
      switch back to the primary network channel in response to a number of neighbor devices present on the alternate network channel.

15. The system of claim 14, wherein the processor is further configured to determine that a value of a transmission failure due to a channel access failure on the primary network channel is above a transmission failure value, wherein the switching to the alternate network channel is performed in response to the determining that the value of the transmission failure is above the transmission failure value.

16. The system of claim 14, wherein the processor is further configured to dispatch a channel switch notification to a plurality of the neighbor devices.

17. The system of claim 14, wherein the processor is further configured to determine a plurality of the neighbor devices are present on the alternate network channel.

18. The system of claim 14, wherein the processor is further configured to determine the switching to the alternate network channel is required, wherein the determining is based on at least one of:
   detecting interference on the primary network channel,
   detecting a link loss between the radio and one or more of the neighbor devices, or
   receiving a channel switch notification.

19. The system of claim 18, wherein the processor is configured to determine that the switching is required based on the receiving the channel switch notification, and the processor is further configured to initiate a timer in response to the receiving the channel switch notification.

20. The system of claim 18, further comprising a non-transitory computer-readable medium coupled to the processor and configured to store a list of the neighbor devices.

21. A system, comprising:
   a radio; and
   a processor coupled to the radio and configured to:
      determine that switching from a primary network channel to an alternate network channel is required, wherein the determining is based on at least one of:
         detecting interference on the primary network channel,
         detecting a link loss between the radio and one or more neighbor devices, or
         receiving a channel switch notification;
      switch to the alternate network channel;
      determine that less than a threshold number of the neighbor devices are present on the alternate network channel; and
      switch back to the primary network channel.

22. The system of claim 21, wherein the alternate network channel has an interference level which is below a threshold interference level.

23. The system of claim 21, wherein the processor is further configured to receive, from a coordinating device, a list of the one or more alternate network channels.

24. The system of claim 21, wherein the processor is further configured to determine a number of the neighbor devices present on the alternate network channel.

25. The system of claim 21, wherein the processor is configured to determine that the switching is required based on the receiving the channel switch notification, and the processor is further configured to initiate a timer in response to the receiving the channel switch notification.

26. The system of claim 21, further comprising a computer-readable medium coupled to the processor and configured to store a list of the neighbor devices.

* * * * *